US 8,732,450 B2

(12) United States Patent  (10) Patent No.: US 8,732,450 B2
Mittapalli et al.  (45) Date of Patent: *May 20, 2014

(54) SYSTEM AND METHOD FOR CONFIGURING OPTION ROM

(75) Inventors: Balaji Mittapalli, Austin, TX (US); Hendrich M. Hernandez, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,362

(22) Filed: Dec. 23, 2011

(65) Prior Publication Data

US 2012/0102311 A1   Apr. 26, 2012

Related U.S. Application Data

(63) Continuation of application No. 12/352,310, filed on Jan. 12, 2009, now Pat. No. 8,108,667.

(51) Int. Cl.
*G06F 9/00* (2006.01)

(52) U.S. Cl.
USPC ............................................. 713/100; 713/1

(58) Field of Classification Search
USPC ...................................... 713/100, 1
See application file for complete search history.

(56) References Cited

U.S. PATENT DOCUMENTS

| 6,944,631 | B2 | 9/2005 | Peter |
| 7,552,238 | B2* | 6/2009 | Gulland ........................ 709/248 |
| 7,721,080 | B2 | 5/2010 | Swanson et al. |
| 7,853,958 | B2 | 12/2010 | Mathew et al. |
| 7,870,373 | B2 | 1/2011 | Rothman et al. |
| 7,908,417 | B2 | 3/2011 | Cho |
| 8,108,667 | B2* | 1/2012 | Mittapalli et al. ............ 713/100 |
| 2006/0095551 | A1 | 5/2006 | Leung et al. |
| 2006/0143209 | A1 | 6/2006 | Zimmer et al. |
| 2007/0011491 | A1 | 1/2007 | Govindarajan et al. |
| 2007/0169088 | A1* | 7/2007 | Lambert et al. ................ 717/168 |
| 2007/0174686 | A1* | 7/2007 | Douglas et al. .................. 714/13 |
| 2007/0186086 | A1* | 8/2007 | Lambert et al. .................... 713/1 |
| 2009/0132799 | A1* | 5/2009 | Brumley et al. .............. 713/100 |
| 2009/0217379 | A1 | 8/2009 | Chang et al. |
| 2010/0241748 | A1 | 9/2010 | Ansari et al. |

OTHER PUBLICATIONS

RD 505070, US, RD, May 10, 2010, A. Brown et al.

* cited by examiner

*Primary Examiner* — Chun Cao
(74) *Attorney, Agent, or Firm* — Larson Newman, LLP

(57) ABSTRACT

An information handling system includes a processor, a first memory, a device, and a management controller that includes a second memory. The management controller obtains configuration data for the device and stores the configuration data in the first memory while the processor is powered off, and configures the device based upon the configuration data from the first memory in response to booting the information handling system.

20 Claims, 5 Drawing Sheets

SYSTEM AND METHOD FOR CONFIGURING OPTION ROM

CROSS REFERENCE TO RELATED APPLICATIONS

This application is a continuation of U.S. patent application Ser. No. 12/352,310, entitled "System and Method for Configuring Option ROM," filed on Jan. 12, 2009, the disclosure of which is hereby expressly incorporated by reference in its entirety.

FIELD OF THE DISCLOSURE

This disclosure relates generally information handling systems, and relates more Hparticularly to configuring resources in information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

An option read-only memory (option ROM) is a firmware component associated with an add-on resource in an information handling system that permits an independent hardware vendor to supply additional firmware to initialize and configure the add-on resource. A typical add-on resource includes a network interface card (NIC), a disk drive controller, or other devices on an information handling system. Option ROM also serves to extend the functionality of the basic input/output system code or extensible firmware interface code (BIOS/EFI), providing an interface between BIOS/EFI and the add-on resource. The option ROM may be in a non-volatile read only memory on the information handling system, or in a non-volatile read only memory on the add-on resource. Typically, the add on resource includes configuration option settings that vary the behavior of the add-on resource, and that can be changed through a user interface that permits an operator to set the configuration option settings. An operator can use a management station that is coupled to a management controller in the information handling system to access the user interface for an add-on resource in the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
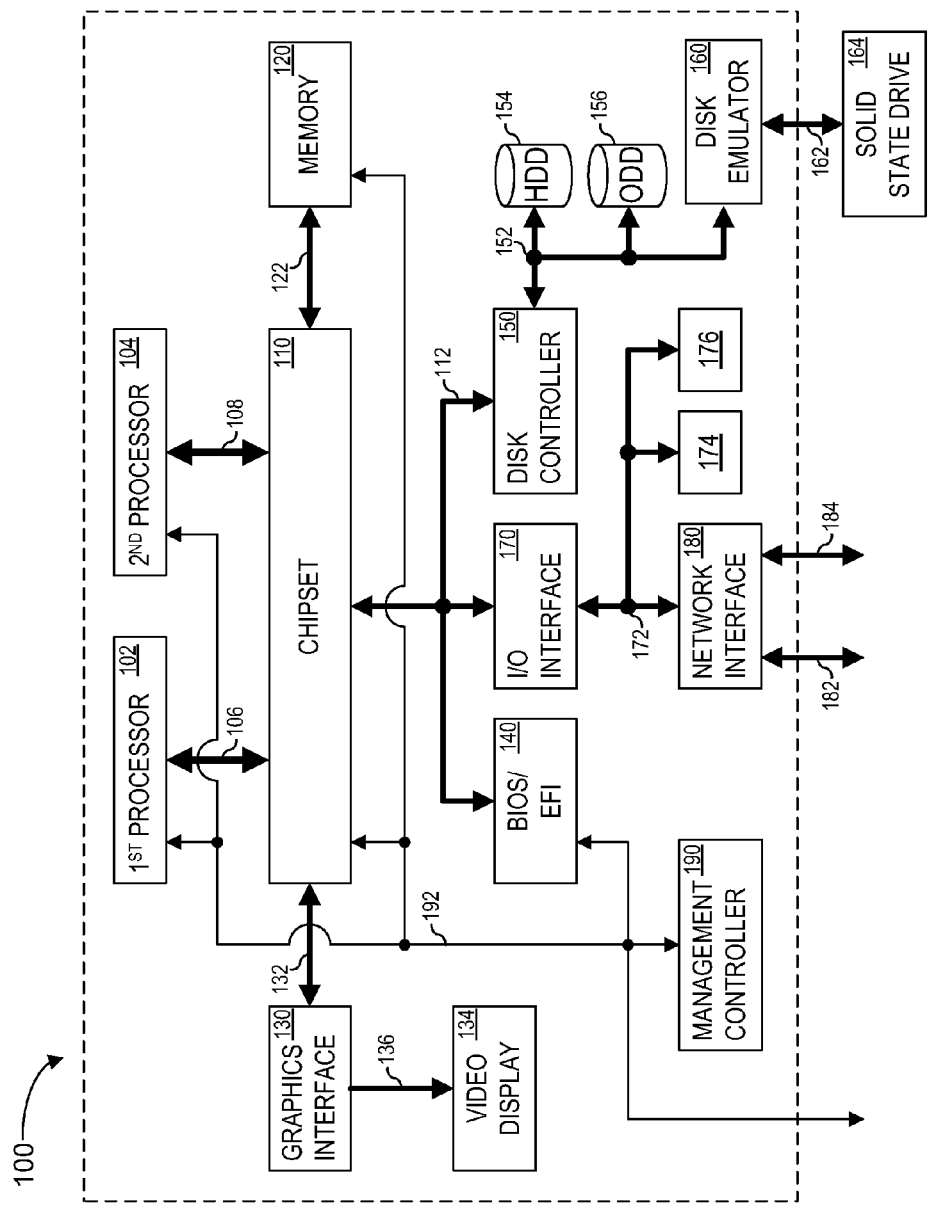
FIG. 1 is a functional block diagram illustrating an exemplary embodiment of an information handling system.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a personal data assistant, a consumer electronic device (e.g., a portable music player, a portable DVD player, or a digital video recorder, etc.), a network communication device (e.g., a server or server blade, a storage device, a switch/router, a wireless router, etc.), or any other suitable device, and can vary in size, shape, performance, functionality, and price. An information handling system can also include a set of any of the foregoing devices.

The information handling system can include one or more processing resources, such as a central processing unit (CPU), volatile memory (e.g. random access memory (RAM), etc.), nonvolatile memory (e.g., read only memory (ROM), flash memory, etc.), hardware, firmware, or software control logic, or any combination thereof. Additionally, the information handling system can include other elements such as one or more storage devices, one or more communications ports for communicating with external devices, one or more input and output (I/O) devices (e.g., a keyboard, a mouse, a video display, etc.), or any combination thereof. The information handling system can also include one or more buses operable to transmit communications between the various hardware resources. Portions of an information handling system may themselves be considered information handling systems.

Portions of an information handling system, when referred to as a "device", a "module", a "resource", or the like, may be configured as hardware, firmware, software, or any combination thereof. A device, a module, or a resource may be implemented in hardware. A non-limiting example of a device, a module, or a resource implemented as hardware includes: an integrated circuit (e.g., an Application Specific Integrated Circuit (ASIC), a Field Programmable Gate Array (FPGA), a structured ASIC, or a device embedded on a larger chip), a card (e.g., a Peripheral Component Interface (PCI) card, a PCI-Express (PCIe) card, a Personal Computer Memory Card International Association (PCMCIA) card, or other such expansion card), or a system (e.g., a motherboard, a system-on-a-chip (SoC), or a stand-alone device). Similarly, the device, a module, or a resource can be implemented in firmware (i.e., any software running on an embedded device, a Pentium class or PowerPC™ brand processor, or other such device) or in software (i.e., any software capable of operating in the relevant environment). The device, module, or resource can also be implemented as a combination of hardware, firmware, or software. Note that an information handling system can include an integrated circuit or a board-level product having portions thereof that can also be any combination of hardware, firmware, or software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Embodiments discussed below describe, in part, distributed computing solutions that manage all or part of a communicative interaction between network elements. A network element may be a node, a piece of hardware, software, firmware, middleware, another component of a computing system, or any combination thereof. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and, involve two or more network elements. For example, a communicative interaction may be "a conversation," or series of related communications between a client and a server—each network element sending and receiving information to and from the other. Whatever form the communicative interaction takes, the network elements involved need not take any specific faun.

A communicative interaction can include management information or content information. As used herein, the term "management information" with respect to a communicative interaction, is intended to mean information used to direct, manage, or other wise control an information handling system or a network of information handling systems. As such, management information can be used by the information handling system to identify the particular elements of the information handling system, to set-up and initialize the elements, to control routing of communicative interactions within the information handling system, to perform another suitable function, or any combination thereof. Likewise, management information can be used by the network or network elements to identify the particular network elements that are coupled to the network, to set-up and initialize the network elements, to control routing of communicative interactions within the network, to perform another suitable function, or any combination thereof. A non-limiting example of management information includes a router set-up command, data packet header information (e.g., addresses), an Internet Control Message Protocol (ICMP) message (e.g., echo request, router discovery, timestamp, etc.), other suitable management information, or any combination thereof.

The term "content information" with respect to a communicative interaction is intended to mean information that is not management information. Thus, content information can include information that is targeted to one or more element, received by the targeted elements to be processed or manipulated, displayed, stored, forwarded to another element, perform another suitable function, or any combination thereof. A non-limiting example of content information includes most data packet payload information, a media file (e.g., audio, video, or picture files, etc.), a textual file (e.g., e-mail, word processing files, etc.), a program, a data file (e.g., spreadsheet or database file, etc.), another suitable form of content information, or any combination thereof.

Two or more information handling systems can be coupled together in a network such that individual information handling systems in the network, referred to as nodes of the network, can exchange information with each other. A non-limiting example of a network includes a local area network (LAN), a metropolitan area network (MAN), a storage area network (SAN), a wide area network (WAN), a wireless local area network (WLAN), a virtual private network (VPN), an intranet, the Internet, any other appropriate network architecture or system, or any combination thereof. The nodes on a network can include storage devices, file servers, print servers, personal computers, laptop computers, personal data assistants, media content players, other devices capable of being coupled to a network, or any combination thereof.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features, but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

FIG. 1 illustrates a functional block diagram of an exemplary embodiment of an information handling system, generally designated as 100. Information handling system 100 can include a processor 102 coupled to a chipset 110 via a host bus 106, and can further include one or more additional processors, generally designated as an $n^{th}$ processor 104 coupled to chipset 110 via a host bus 108. Chipset 110 can support processors 102 through 104, allowing for simultaneous processing by processors 102 through 104, and can support the exchange of information within information handling system 100 during multiple processing operations. As illustrated, chipset 110 functions to provide access to processor 102 via host bus 106, and $n^{th}$ processor 104 via host bus 108. In another embodiment (not illustrated), chipset 110 can include a dedicated bus to transfer data between processors 102 and 104. In accordance with yet another aspect, chipset 110 can be generally considered an application specific chipset that provides connectivity to various buses, and integrates other system functions. As such, chipset 110 can be provided using a chipset that includes two or more parts. For example, chipset 110 can include a Graphics and Memory Controller Hub (GMCH) and an I/O Controller Hub (ICH), or can include a Northbridge and a Southbridge. Chipset 110 can also be packaged as an ASIC.

Information handling system 100 can include a memory 120 coupled to chipset 110 via a memory bus 122. As illustrated, chipset 110 can be referred to as a memory controller, where chipset 110 is coupled to host buses 106 through 108, and memory bus 122 as individual buses. In another embodiment, (not illustrated), chipset 110 is coupled to processors 102 and 104, and to memory 120 via a common bus. In either case, chipset 110 can also provide bus control and can handle transfers between processors 102 and 104 and memory 120. In accordance with another aspect (not illustrated), an information handling system can include a separate memory dedicated to each of the processors. As such, each memory can be coupled to a processor via a separate memory bus, such that each processor has a dedicated memory. A non-limiting example of memory 120 includes static, dynamic. Or non-volatile random access memory (SRAM, DRAM, or NVRAM), read only memory (ROM), flash memory, another type of memory, or any combination thereof.

Information handling system 100 can also include a graphics interface 130 that can be coupled to chipset 110 via a graphics bus 132. Graphics interface 130 can provide a video display output 136 to a video display 134. In one form, graphics interface 130 can be an Accelerated Graphics Port (AGP) interface to display content within video display 134. Other graphics interfaces (not illustrated) may also be used in addition to graphics interface 130 if needed or desired. Video display 134 can include one or more types of video displays, such as a flat panel display or other type of display device.

Information handling system 100 can also include a basic input and output system/extensible firmware interface (BIOS/EFI) module 140 coupled to chipset 110 via an I/O channel 112. BIOS/EFI module 140 can include BIOS/EFI code operable to detect and identify resources within information handling system 100, provide the appropriate drivers for those resources, initialize those resources, and access those resources. I/O channel 112 can include a Peripheral Component Interconnect (PCI) bus, a PCI-Extended (PCI-X) bus, a high-speed link of PCI-Express (PCIe) lanes, another industry standard or proprietary bus or link, or any combination thereof. In one embodiment, a PCI bus can be operated at approximately 66 MHz, a PCI-X bus can be operated at approximately 133 MHz, and a PCIe link can be operated at approximately 250 million bytes per second (MB/s) per lane in each direction. PCI buses, PCI-X buses, and PCIe links can be provided to comply with industry standards for connecting and communicating between various PCI, PCI-X and PCIe enabled hardware devices, respectively. Chipset 110 can include other buses in association with, or independent of, I/O channel 112, including other industry standard buses (e.g., Industry Standard Architecture (ISA), Small Computer Serial Interface (SCSI), Inter-Integrated Circuit ($I^2C$), System Packet Interface (SPI), or Universal Serial Bus (USB), proprietary buses or any combination thereof.

Information handling system 100 can also include a disk controller 150 coupled to chipset 110 via I/O channel 112. Disk controller 150 can include a disk interface 152 that can include other industry standard buses (e.g., Integrated Drive Electronics (IDE), Parallel Advanced Technology Attachment (PATA), Serial Advanced Technology Attachment (SATA), SCSI, or USB or proprietary buses, or any combination thereof. Disk controller 150 can be coupled to one or more disk drives via disk interface 152. Such disk drives include a hard disk drive (HDD) 154 or an optical disk drive (ODD) 156 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 156 can read a removable data storage medium (e.g., a Compact Disk (CD), a Digital Video Disk (DVD), a mini Digital Video Disk (mini-DVD), or other optical media). Additionally, information handling system 100 can include a disk emulator 160 that is coupled to disk interface 152 via disk interface 152. Disk emulator 160 can permit a solid-state drive 164 to be coupled to information handling system 100 via an external interface 162. External interface 162 can include other industry standard busses (e.g., USB or IEEE 1394 (Firewire)) or proprietary busses, or any combination thereof. Alternatively, solid-state drive 164 can be disposed within information handling system 100.

Information handling system 100 can also include an I/O interface 170 coupled to chipset 110 via I/O channel 112. I/O interface 170 can be coupled to a peripheral channel 172 that can be of the same industry standard or proprietary bus or link architecture as I/O channel 112, or of a different industry standard or proprietary bus or link architecture than I/O channel 112. As such, I/O interface 170 can extend I/O channel 112 capacity when peripheral channel 172 is the same as I/O channel 112, or translate information from a type suitable to the industry standard or proprietary bus or link architecture of I/O channel 112 to a type suitable to a different industry standard or proprietary bus or link architecture, and vise versa, when peripheral channel 172 is different than I/O channel 112. Other I/O interfaces (not illustrated) may also be used in addition to I/O interface 170, if needed or desired.

Peripheral channel 172 can include a bus structure that allows the installation and coupling of add-on resources 174 through 176 to the information handling system. In accordance with an aspect (not illustrated), peripheral channel 172 can also include one or more point-to-point links to add-on resources 174 through 176. Add-on resources 174 through 176 can include a data storage system, a graphics interface, a network interface card (NIC), a sound/video processing card, another suitable add-on resource or any combination thereof. Add-on resources 174 through 176 can be on a main circuit board, on separate circuit boards or add-in cards disposed within information handling system 100, devices that are external to information handling system 100, or any combination thereof.

Add-on resources 174 and 176 can include an option read-only memory (option ROM) (not illustrated). The option ROM is a firmware component supplied by the maker of a particular add-on resource 174 or 176 that operates to initialize and configure the add-on resource 174 or 176 during boot of information handling system 100. Option ROM may also extend the functionality of BIOS/EFI module 140 to incorporate the functionality of add-on resource 174 or 176 into information handling system 100. As such, the option ROM provides an interface between BIOS/EFI module 140 and add-on resource 174 or 176, permitting BIOS/EFI module 140 to implement functions specific to add-on resource 174 or 176, such as power-on self test, interrupt service, or input/output service calls. When add-on resource 174 or 176 is on the main circuit board or a separate circuit board, the option ROM may be in memory 120. When add-on resource 174 or 176 is an add-in card, the option ROM may be in a memory on add-on resource 174 or 176.

Add-on resources 174 and 176 can include configuration option settings that vary the behavior of add-on resources 174 and 176. For example, a network interface card can be configured with a particular Internet Protocol address, or a SCSI disk controller can be configured as a Redundant Array of Independent Drives (RAID). The option ROM for add-on resources 174 and 176 can include a user interface (UI) (not illustrated) that permits an operator of information handling system 100 to change the configuration option settings.

Information handling system 100 can also include a network interface device 180 that is coupled to I/O interface 170 via peripheral channel 172. Network interface device 180 may be a network interface card (NIC) disposed within information handling system 100, on a main circuit board (e.g., a baseboard, a motherboard, or any combination thereof), integrated onto another component such as chipset 110, in another suitable location, or any combination thereof. Network interface device 180 can include a network channel 182 and a network channel 184 that provide interfaces between I/O interface 170 and devices that are external to information handling system 100. Network interface device 180 can also include additional network channels (not illustrated). In accordance with an aspect, network channels 182 and 184 are of a different industry standard or proprietary bus or link architecture than peripheral channel 172, and network interface device 180 can translate information from a type suitable to the industry standard or proprietary bus or link architecture of peripheral channel 172 to a type suitable to the industry standard or proprietary bus or link architecture of network channels 182 and 184, and vise versa.

Network channels 182 and 184 can be of industry standard architecture (e.g., InfiniBand, Fibre Channel, Gb Ethernet, etc.), proprietary channel architecture, or any combination thereof. Other network interface devices (not illustrated) may also be used in addition to network interface device 180, if needed or desired. Network channels 182 and 184 can be coupled to network resources (not illustrated). The network resource can include another information handling system, a data storage system, another network, a grid management system, another suitable resource or any combination thereof.

Information handling system 100 can further include a management controller (MC) 190 that can be coupled to processors 102 and 104, chipset 110, memory 120, and BIOS/EFI module 140 via a system communication bus 192. MC 190 may be on a main circuit board (e.g., a baseboard, a motherboard, or any combination thereof), integrated onto another component such as chipset 110, in another suitable location, or any combination thereof. Other resources, such as graphics interface 130, video display 134, I/O interface 170, disk controller 150, network interface 180, or any combination thereof, can be coupled to MC 190. System communication bus 192 can also provide an interface between MC 190 and devices that are external to information handling system 100. For example, MC 190 can be coupled via system communication bus 192 to a management station (not illustrated) for out-of-band management of information handling system 100. MC 190 can be on a separate power plane in information handling system 100, so that MC 190 can be operated while other portions of information handling system 100 are powered off MC 190 may also be operated in a pre-operating-system operating state (e.g. during boot of information handling system 100). Commands, communications, or other signals may be sent to or received from MC 190 by any one or any combination of resources previously described. MC 190 can be part of an integrated circuit or a chip set within information handling system 100. A non-limiting example of a MC 190 includes a baseboard management controller (BMC), an integrated Dell remote access controller (iDRAC), another controller, or any combination thereof. A non-limiting example of a system communication bus 192 includes an inter-integrated circuit ($I^2C$) bus, a system management bus (SMBus), a serial peripheral interface (SPI) bus, another bus, or any combination thereof.

Figure 2:
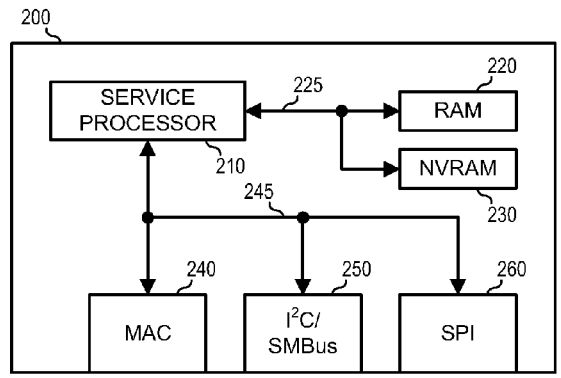
FIG. 2 is a functional block diagram illustrating an embodiment of a management controller in an information handling system.

FIG. 2 illustrates an embodiment of a management controller (MC) 200 that may be similar to MC 190. MC 200 includes a service processor 210, a random-access memory (RAM) 220, an NVRAM 230, a media access control interface (MAC) 240, an $I^2C$/SMBus interface 250, and an SPI interface 260. RAM 220 and NVRAM 230 are coupled to service processor 210 through a memory bus 225. MAC 240, $I^2C$/SMBus interface 250, and SPI interface 260 are coupled to service processor 210 through an I/O bus 245. MC 200 functions as a separate microcontroller in an information handling system, providing a dedicated management channel for maintenance and control of resources in the information handling system. As such, the resources in the information handling system can be coupled to $I^2C$/SMBus interface 250, and SPI interface 260, permitting MC 200 to receive information from or send information to the resources. MC 200 can also be coupled to an external network through MAC 240, permitting MC 200 to receive information from or send information to an external management station. MAC 240 can include an Ethernet standard interface, such as a reduced media independent interface (RMII), a network communication service interface (NC-SI), another network standard interface, or any combination thereof.

MC 200 can be implemented as one or more integrated circuit devices, and may be incorporated into a main circuit board or a separate circuit board of the information handling system. MC 200 can also operate on a separate power plane from other resources in the information handling system. Thus MC 200 can communicate with the external management station while the resources of the information handling system are powered off. In this way, information can be sent from the management station to MC 200 that can be stored in RAM 220 or NVRAM 230. Information stored in RAM 220 may be lost after power-down of the power plane for MC 200, while information stored in NVRAM 230 may be saved through a power-down/power-up cycle of the power plane for MC 200.

In an embodiment of the present disclosure, a managed system, similar to information handling system 100, includes a management controller that is coupled to a management station. The management station is operative to send configuration settings for an add-on resource to the management controller. The management controller can store the configuration settings while the managed system is powered off, and can save the configuration settings in memory in the managed system after the managed system is powered on. In this manner, an operator can quickly configure multiple managed systems in a network without having to separately access an option ROM (UI) on each managed system.

Figure 3:
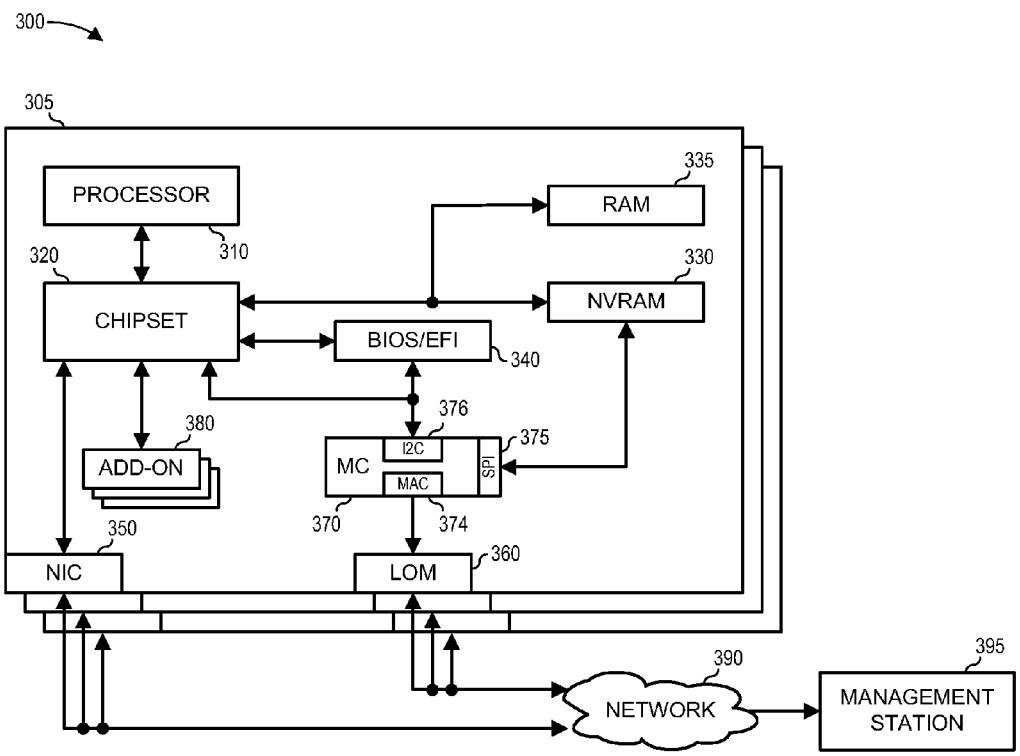
FIG. 3 is a functional block diagram illustrating an embodiment of a managed system of the present disclosure.

FIG. 3 illustrates an embodiment of a managed network 300. Managed network 300 includes one or more managed system 305 which may be similar to information handling system 100, a network 390, and a management station (MS) 395. Managed system 305 includes a processor 310, a chipset 320, a system NVRAM 330, a system RAM 335, a NIC 350, a LAN-on-motherboard (LOM) 360, an MC 370 which may be similar to MC 200, and one or more add-on resource 380. Processor 310 is coupled to chipset 320. Chipset 320 is also coupled to system NVRAM 330 and system RAM 335. Chipset 320 is also coupled to a BIOS/EFI module 340, to NIC 350, and to add-on resource 380. MC 370 includes a MAC 374, an I²C/SMBus interface 375, and an SPI interface 376. MC 370 is coupled to chipset 320 and to BIOS/EFI module 340 via I²C/SMBus interface 375. MC 370 is also coupled to system NVRAM 330 via SPI interface 376. MC 370 is further coupled to LOM 360 via MAC 374. NIC 350 and LOM 360 are coupled to network 390, and network 380 is coupled to MS 395.

Having installed a managed system 305 on managed network 300, a network operator can create a configuration file on MS 395 that includes configuration option settings for an add-on resource 380 in managed system 305. MC 370 and LOM 380 can be powered on when managed system 305 is installed, and managed system 305 can exchange information with network 390 and MS 395. Thus MS 395 can send the configuration file to MC 370. In a particular embodiment, MC 370 can store the configuration file within MC 370, for example in a RAM similar to RAM 220, or in an NVRAM similar to NVRAM 230. In another embodiment, system NVRAM 330 in managed system 305 can share a power plane with MC 370 and LOM 380, and can thus be powered separately from other components of managed system 305. MC 370 can store the configuration file in system NVRAM 330.

In particular, MC 370 can store the configuration file in a location where BIOS/EFI module 340 can retrieve the configuration option settings for add-on resource 380.

With the configuration file stored on managed system 305, managed system 305 can be powered on and use the configuration file to set the configuration option settings for add-on resource 380. In the embodiment where the configuration file is stored in system NVRAM 330, BIOS/EFI module 340 can shadow the contents of system NVRAM 330 to system RAM 335, and initialize add-on resource 370 with the configuration option settings during the bootstrap process of managed system 305. In the embodiment where the configuration file is stored in a RAM or an NVRAM within MC 370, add-on resource 380 can include an option ROM. Then, when BIOS/EFI module 340 completes the bootstrap process and queries add-on resource 380 for the presence of an option ROM, the option ROM can obtain the configuration option settings from MC 370 by reading the configuration file from MC 370. The option ROM can further direct MC 370 to store the configuration file in system NVRAM 330 or system RAM 335 for future use.

Similar methods to those described above can also be employed to make changes to the configuration option settings of managed system 305, while managed system 305 is operating. For example, a network operator can send a configuration file to MC 370, and direct MC 370 to shut down and reboot managed system 305. The network operator can also create several individual configuration files, each including the configuration option settings for a different add-on resource 380 in managed system 305. Where two or more of managed systems 305 include the same type of add-on resource that needs to be configured similarly on each of managed system 305, the same configuration file can be sent to managed system 305, saving the network operator from having to configure each managed system 305 separately. For example, a network of data storage servers can include the same RAID controller, and the network operator can configure each data storage server with the same RAID configuration. Where a similar type of add-on resource in two of managed system 305 needs to be configured differently, a different configuration file can be sent to each managed system 305. For example, the network of data storage servers can include the same Ethernet adapter that each require a different IP address to avoid address contention on the network, and each configuration file can include a unique IP address. Further, several configuration files can be combined together to into a single file that provides the managed system 305 with the configuration option settings for several add-on resources.

Figure 4:
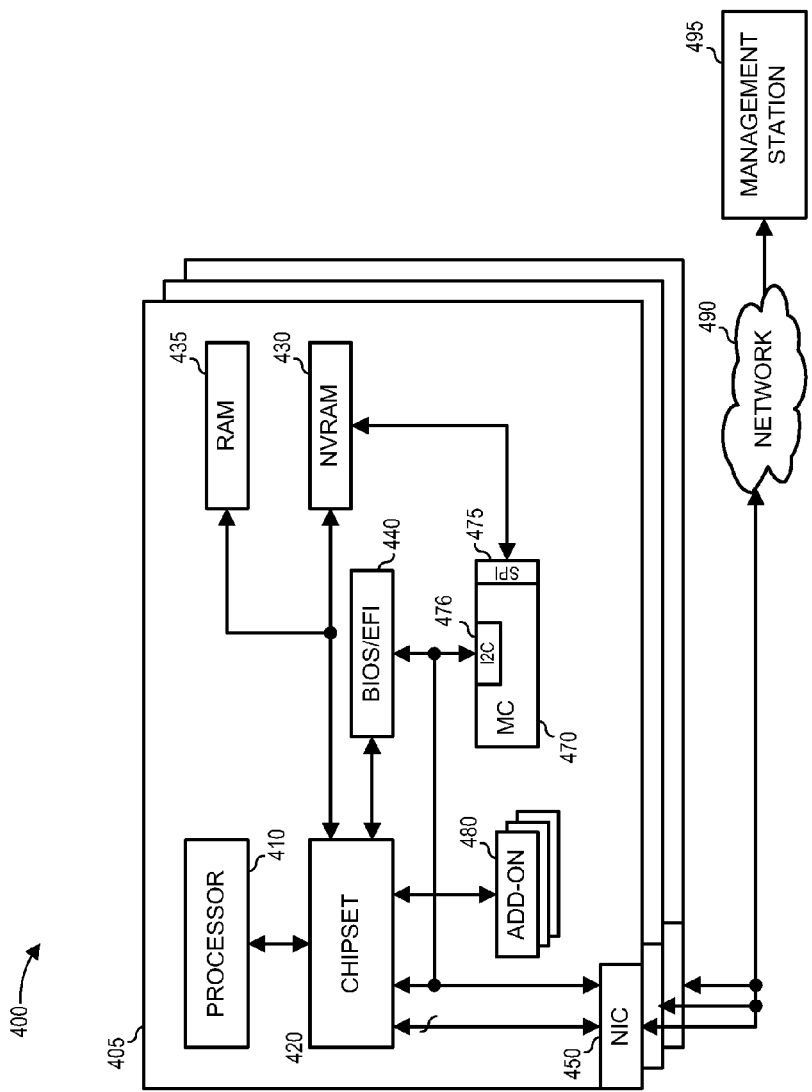
FIG. 4 is a functional block diagram illustrating another embodiment of a managed system of the present disclosure.

FIG. 4 illustrates an embodiment of a managed network 400 which may be similar to managed network 300. Managed network 400 includes one or more managed system 405 which may be similar to managed system 305, a network 490, and a management station 495. Managed system 405 includes a processor 410, a chipset 420, a system NVRAM 430, a system RAM 435, a NIC 450, an MC 470 similar to MC 370, and one or more add-on resource 480. In most respects, the elements of managed system 405 are coupled similarly to managed system 305, except that MC 470 is also coupled via I²C/SMBus interface 476 to NIC 450. NIC 450 is coupled to network 480, and network 490 is coupled to management station 495. This embodiment has the advantage of using one less connection per managed system 405.

NIC 450 and MC 470 can be powered on when managed system 305 is installed, such that managed system 405 can exchange information with network 490 and MS 495, and MS 495 can send a configuration file to MC 470. MC 470 can store the configuration file in MC 470, or in system NVRAM 430, and BIOS/EFI module 440 can shadow the contents of system NVRAM 430 to system RAM 435 and initialize add-on resource 370, or can query add-on resource 480 for the presence of an option ROM that obtains the configuration option settings from MC 470.

Figure 5:
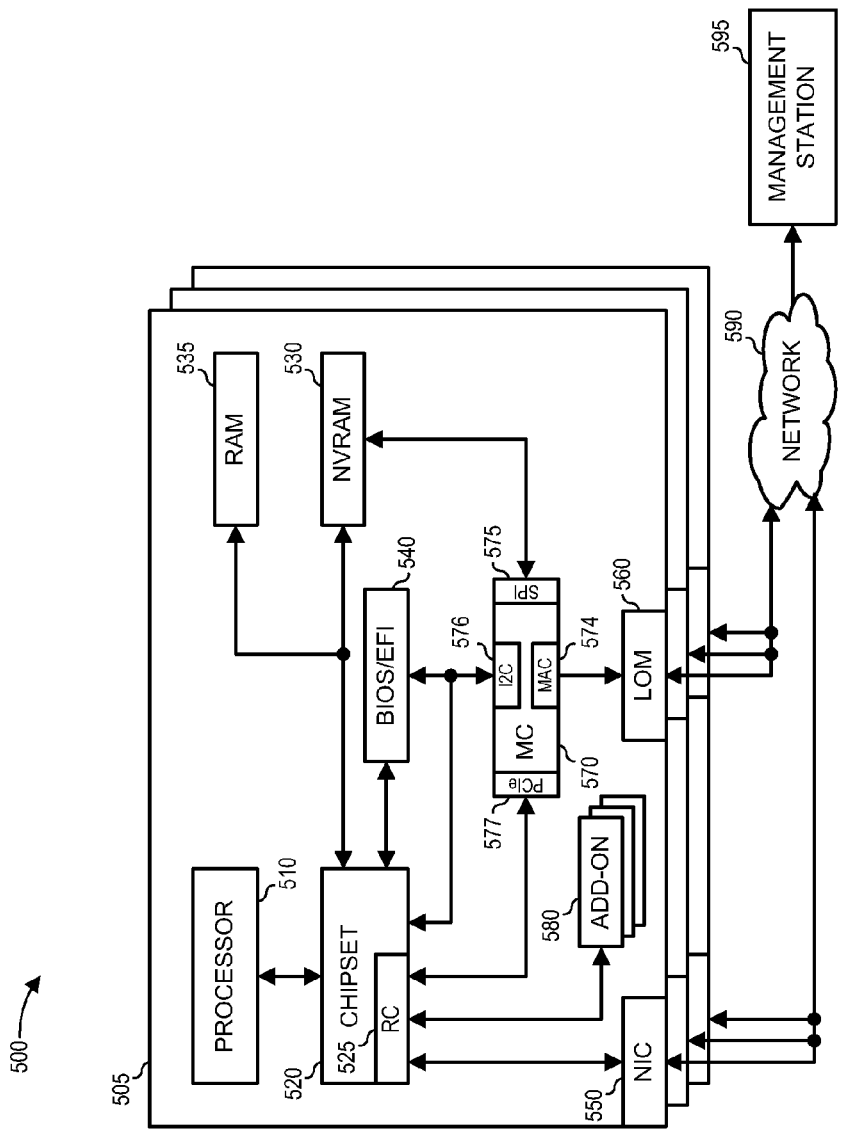
FIG. 5 is a functional block diagram illustrating another embodiment of a managed system of the present disclosure.

FIG. 5 illustrates an embodiment of a managed network 500 which may be similar to managed network 300. Managed network 500 includes one or more managed system 505 which may be similar to managed system 305, a network 590, and a management station 595. Managed system 505 includes a processor 510, a chipset 520, a system NVRAM 530, a system RAM 535, a NIC 550, a LOM 560, an MC 570 similar to MC 370, and one or more add-on resource 580. Processor 510 includes a PCIe Root Complex (RC) 515. MC 570 includes a MAC 574, an I$^2$C/SMBus interface 575, an SPI interface 576, and a PCIe interface 577. In most respects, the elements of managed system 505 are coupled similarly to managed system 305, except that MC 570 is also coupled via PCIe interface 577 to RC 515, and that add-on resource 580 is coupled to RC 515. NIC 550 and LOM 560 are coupled to network 590, and network 585 is coupled to management station 590. This configuration has the advantage of a high speed connection between MC 570 and NIC 550 for initial configuration of managed system 505, and during execution of option ROM, and the flexibility to use LOM 560 for management purposes in normal operation.

Figure 6:
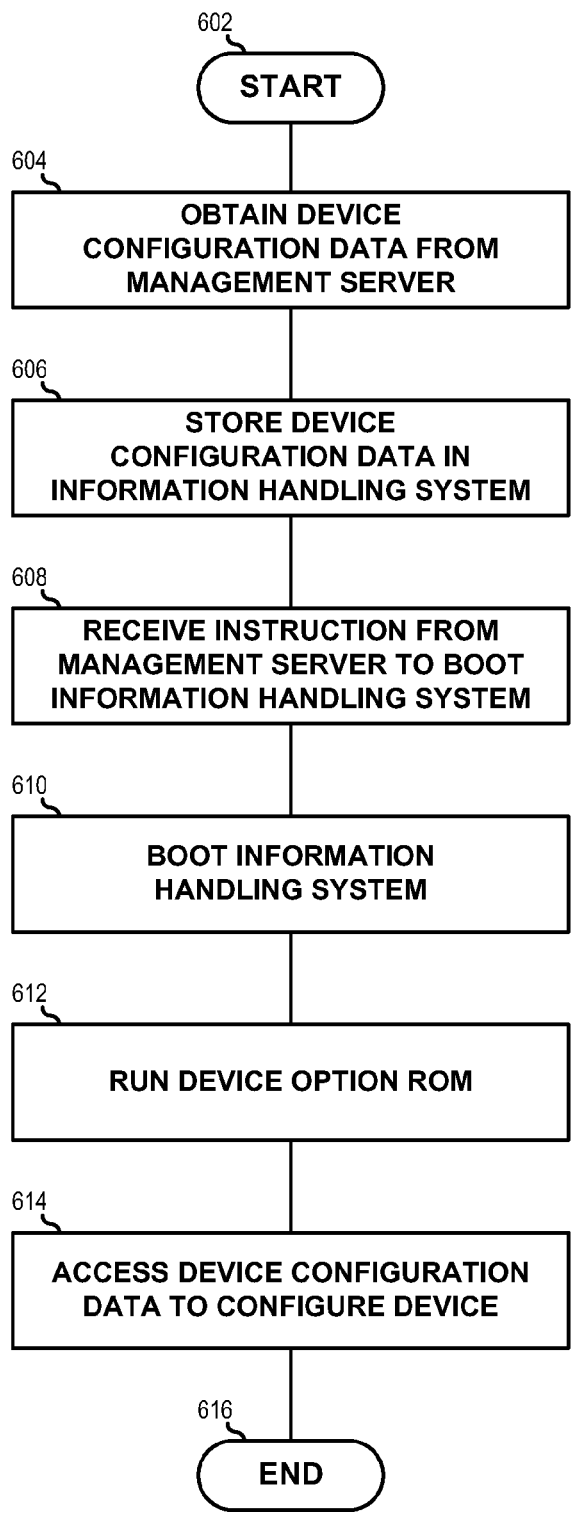
FIG. 6 is a flow chart illustrating a method of managing the device configuration settings in an information handling system.

FIG. 6 illustrates a method of managing the divice configuration settings in an information handling system. The method starts in block 602. A management controller is operated to obtain device configuration data for a device on an information handling system from a management server in block 604. The device may include an add-in device in the information handling system, and may also include an option ROM. The management controller may include a LOM. The management controller may be operated while the information handling system is in a pre-operating-system operating state, or while the processor in the information handling system is inoperative. The management controller stores the device configuration data in the information handling system in block 606. For example, the device configuration data can be stored in a memory in the management controller, or in system memory in the information handling system. The management controller receives an instruction from the management server to boot the information handling system in block 608. The skilled artisan will appreciate that receiving a instruction from the management server to boot the information handling system may be an optional step in the method herein described. The information handling system is booted in block 610. Where, as described above, the device includes an option ROM, the option ROM is run in block 612. The skilled artisan will appreciate that running the option ROM may be an optional step in the method described herein. The device configuration data is accessed to configure the device in block 614, and the method ends in block 616.

In a first aspect, a method of configuring an information handling system includes operating a management controller in the information handling system to obtain device configuration data from a management server, storing the device configuration data in the information handling system, booting the information handling system, and accessing the device configuration data to configure a device in the information handling system in response to booting the information handling system. In an embodiment, the device comprises an add-in device. In another embodiment, the management controller comprises a LAN-on-motherboard device. In another embodiment, operating the management controller to obtain device configuration data includes operating the management controller while the information handling system is operating in a pre-operating-system environment. In a further embodiment, operating the management controller to obtain device configuration data includes operating the management controller while a processor is inoperative.

In an embodiment of the first aspect, the configuration data is stored in a memory of the management controller. In yet another embodiment, device configuration data is stored in a non-volatile memory of the information handling system. In still another embodiment, the method includes receiving from the management server an instruction to boot the information handling system, and the information handling system is booted in response to receiving the instruction to boot the information handling system from the management server. In another embodiment, the device includes an option read only memory firmware. In yet another embodiment, the method includes running the option ROM firmware in response to booting the information handling system, and accessing the device configuration data is performed in response to running the option ROM firmware.

In another aspect, machine-executable code for an information handling system is embedded within a tangible medium and includes instructions for carrying out a method including obtaining configuration data for a device from a management server, storing the configuration data in a management controller in the information handling system, booting the information handling system, and, in response to booting the information handling system, detecting the device in the information handling system and accessing the configuration data to configure the device. In an embodiment, obtaining the first configuration data includes operating the management controller to obtain the configuration data. In another embodiment, obtaining the configuration data is performed while the information handling system is operating in a pre-operating-system environment. In yet another embodiment, obtaining the configuration data is performed while a processor, operative to run the information handling system, is inoperative. In still another embodiment, the method includes obtaining configuration data for a second device from a management server, storing the configuration data for the second device in the management controller in the information handling system, and, in response to booting the information handling system, detecting the second device in the information handling system, and accessing the configuration data for the second device to configure the second device. In another embodiment, the first device includes an option ROM firmware, the method further includes running the option ROM firmware in response to booting the information handling system, and accessing the configuration data for the first device is performed in response to running the option ROM firmware.

In a third aspect, an information handling system includes a processor, a device, and a management controller. The management controller is operable to obtain configuration data for the device from a management server, store the configuration data, boot the information handling system, and access the configuration data to configure the device in response to booting the information handling system. In an embodiment, the device includes an add-in device. In another embodiment, the management controller includes a LAN-on-motherboard device. In yet another embodiment, the management controller operates to receive a command to boot the information handling system from the management controller.

Note that not all of the activities described above in the general description or the examples are required, that a portion of a specific activity may not be required, and that one or more further activities may be performed, in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features described herein in the context of separate embodiments for the sake of clarity, may also be provided in combination in a single embodiment. Conversely, various features that are, for brevity, described in the context of a single embodiment, may also be provided separately, or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur, or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor;
   a first memory;
   a device comprising an option Read-Only Memory (ROM); and
   a management controller, wherein the management controller obtains option ROM information for the device and stores the option ROM information in a second memory external to the management controller, while the processor is powered off;
   wherein, in response to booting the information handling system:
   the processor executes the option ROM on the device; and
   the option ROM requests the option ROM information from the second memory.

2. The information handling system of claim 1, wherein the device comprises an add-in device.

3. The information handling system of claim 1, wherein:
   the management controller comprises a LAN-on-motherboard (LOM) device; and
   in obtaining the option ROM information, the management controller accesses the LOM device.

4. The information handling system of claim 3, wherein the LOM device is coupled to a management server that provides the configuration data.

5. The information handling system of claim 1, wherein further the management controller further stores the device option ROM information in the second memory.

6. The information handling system of claim 1, wherein the first memory comprises a non-volatile memory.

7. The information handling system of claim 1, wherein:
   the management controller receives an instruction to boot the information handling system, the instruction being received from a management server; and
   wherein booting the information handling system is in response to receiving the instruction.

8. The information handling system of claim 1, wherein the device includes an option ROM firmware.

9. The information handling system of claim 8, wherein:
   in further response to booting the information handling system:
   the information handling system runs the option ROM firmware; and
   the device requests the option ROM information from the management controller in response to running the option ROM firmware.

10. A method of configuring an information handling system, comprising:
    accessing by a management controller of the information handling system a network interface of the information handling system to obtain option Read-Only Memory (ROM) information for a device of the information handling system while a processor of the information handling system is powered off;
    storing the option ROM information in a memory external to the management controller while the processor is powered off;
    booting the information handling system; and
    in response to booting the information handling system:
    executing an option ROM of a device of the information handling system; and
    requesting, by the option ROM, the option ROM information from the memory.

11. The method of claim 10, wherein the management controller accesses the network interface via a Peripheral Component Interconnect-Express (PCIe) interface.

12. The method of claim 10, wherein the management controller accesses the network interface via an Inter-Integrated Circuit (I2C) bus.

13. The method of claim 10, further comprising:
    receiving at the management controller an instruction to boot the information handling system, the instruction being received from a management server;
    wherein booting the information handling system is in response to receiving the instruction.

14. The method of claim 10, wherein the device includes an option ROM firmware.

15. The method of claim 10, wherein in further response to booting the information handling system, the method comprises:
    running the option ROM firmware; and
    requesting by the device to receive the option ROM information from the management controller in response to running the option ROM firmware.

16. A non-transitory computer-readable medium including code for carrying out a method, the method comprising:
    accessing by a management controller of the information handling system a network interface of the information handling system to obtain option Read-Only Memory (ROM) information for a device of the information handling system while a processor of the information handling system is powered off;

storing the option ROM information in a memory external to the management controller while the processor is powered off;
booting the information handling system; and
in response to booting the information handling system:
   executing an option ROM of a device of the information handling system; and
   requesting, by the option ROM, the option ROM information from the memory.

17. The computer-readable medium of claim 16, wherein the management controller accesses the network interface via a Peripheral Component Interconnect-Express (PCIe) interface.

18. The computer-readable medium of claim 16, wherein the management controller accesses the network interface via an Inter-Integrated Circuit (I2C) bus.

19. The computer-readable medium of claim 16, the method further comprising:
   receiving at the management controller an instruction to boot the information handling system, the instruction being received from a management server;
   wherein booting the information handling system is in response to receiving the instruction.

20. The computer-readable medium of claim 16, wherein:
the device includes an option ROM firmware; and
in further response to booting the information handling system, the method comprises:
   running the option ROM firmware; and
   requesting by the device to receive the option ROM information from the management controller in response to running the option ROM firmware.

\* \* \* \* \*